(12) United States Patent
Fujita

(10) Patent No.: US 10,838,567 B2
(45) Date of Patent: Nov. 17, 2020

(54) TOUCH PANEL DEVICE

(71) Applicant: FUJITSU COMPONENT LIMITED, Tokyo (JP)

(72) Inventor: Kenichi Fujita, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/330,477

(22) PCT Filed: Sep. 7, 2017

(86) PCT No.: PCT/JP2017/032314
§ 371 (c)(1),
(2) Date: Mar. 5, 2019

(87) PCT Pub. No.: WO2018/074092
PCT Pub. Date: Apr. 26, 2018

(65) Prior Publication Data
US 2019/0220120 A1    Jul. 18, 2019

(30) Foreign Application Priority Data

Oct. 21, 2016    (JP) .................................. 2016-207273

(51) Int. Cl.
*G06F 3/045*        (2006.01)
*G06F 3/041*        (2006.01)

(52) U.S. Cl.
CPC ............ *G06F 3/045* (2013.01); *G06F 3/0414* (2013.01); *G06F 3/0416* (2013.01); *G06F 2203/04104* (2013.01)

(58) Field of Classification Search
CPC ...... G06F 3/045; G06F 3/0416; G06F 3/0414; G06F 2203/04104
See application file for complete search history.

(56) References Cited

U.S. PATENT DOCUMENTS 5,262,778 A * 11/1993 Saunders ................ G06F 3/045
178/18.01
5,453,941 A    9/1995 Yoshikawa
(Continued)

FOREIGN PATENT DOCUMENTS

CN    102999243 A    3/2013
JP    5-150890    6/1993
(Continued)

OTHER PUBLICATIONS

Japanese Platform for Patent Information English abstract for Japanese Patent Publication No. 2015-41159, published Mar. 2, 2015.
(Continued)

*Primary Examiner* — Vinh T Lam
(74) *Attorney, Agent, or Firm* — Staas & Halsey LLP

(57) ABSTRACT

A CPU of a touch panel device controls a plurality of switches so as to apply a voltage to an XL electrode and ground a YH electrode, measures a voltage difference between an XH electrode and a YL electrode as a first pressing force, controls the plurality of switches so as to apply a voltage to the XH electrode and ground the YL electrode, measures a voltage difference between the XL electrode and the YH electrode as a second pressing force, associates the first pressing force and the second pressing force with coordinates of two points, respectively, and outputs the associated data to a computer.

5 Claims, 11 Drawing Sheets

(56) References Cited

U.S. PATENT DOCUMENTS

| | | | |
|---|---|---|---|
| 5,518,078 | A | 5/1996 | Tsujioka et al. |
| 9,244,562 | B1 | 1/2016 | Rosenberg et al. |
| 2003/0210235 | A1 | 11/2003 | Roberts |
| 2009/0189877 | A1 | 7/2009 | Washino et al. |
| 2012/0019477 | A1* | 1/2012 | Fujita .................. G06F 3/045 345/174 |
| 2012/0127125 | A1 | 5/2012 | Ito et al. |
| 2012/0158332 | A1 | 6/2012 | Sakurai et al. |
| 2012/0262417 | A1 | 10/2012 | Wakasugi et al. |
| 2014/0111477 | A1* | 4/2014 | Lv .................. G06F 3/045 345/174 |
| 2016/0357342 | A1* | 12/2016 | Olley .................. G06F 3/044 |

FOREIGN PATENT DOCUMENTS

| | | |
|---|---|---|
| JP | 5-265630 | 10/1993 |
| JP | 6-309087 | 11/1994 |
| JP | 2000-56914 | 2/2000 |
| JP | 2011-123815 | 6/2011 |
| JP | 5642500 | 5/2012 |
| JP | 2012-128677 | 7/2012 |
| JP | 2015-41159 | 3/2015 |
| KR | 10-2012-0011782 | 2/2012 |
| TW | 200937272 | 9/2009 |
| TW | 201234252 A1 | 8/2012 |

OTHER PUBLICATIONS

Japanese Platform for Patent Information English abstract for Japanese Patent Publication No. 5-150890, published Jun. 18, 1993.
Japanese Platform for Patent Information English abstract for Japanese Patent Publication No. 5-265630, published Oct. 15, 1993.
Japanese Platform for Patent Information English abstract for Japanese Patent Publication No. 2011-123815, published Jun. 23, 2011.
Japanese Platform for Patent Information English abstract for Japanese Patent Publication No. 2012-128677, published Jul. 5, 2012.
Japanese Platform for Patent Information English abstract for Japanese Patent Publication No. 2000-56914, published Feb. 25, 2000.
Japanese Platform for Patent Information English abstract for Japanese Patent Publication No. 6-309087, published Nov. 4, 1994.
Espacenet English abstract for Taiwanese Patent Publication No. 200937272, published Sep. 1, 2009.
Espacenet English abstract for Chinese Patent Publication No. 102999243 A, published Mar. 27, 2013.
Espacenet English abstract for Taiwanese Patent Publication No. 201234252 A1, published Aug. 16, 2012.
Taiwanese Office Action dated May 28, 2018 in corresponding Taiwanese Patent Application No. 106130584.
International Search Report dated Oct. 24, 2017 in corresponding International Patent Application No. PCT/JP2017/032314.
Written Opinion of the International Searching Authority dated Oct. 24, 2017 in corresponding International Patent Application No. PCT/JP2017/032314.
English Translation of the Written Opinion of the International Searching Authority dated Oct. 24, 2017 in corresponding International Patent Application No. PCT/JP2017/032314.
Office Action, dated Apr. 27, 2020, in corresponding Korean Application No. 10-2019-7009847 (11 pp.).
Extended European Search Report, dated Jun. 15, 2020, in European Application No. 17861960.7 (9 pp.).

* cited by examiner

FIG. 7

| CONTACT NUMBER | ON/OFF INFORMATION | X-COORDINATE | Y-COORDINATE | PRESSING FORCE |
|---|---|---|---|---|

FIG. 10

| CONTACT NUMBER | ON/OFF INFORMATION | X-COORDINATE | Y-COORDINATE | PRESSING FORCE | PRESSING CHANGE FLAG |
|---|---|---|---|---|---|

TOUCH PANEL DEVICE

CROSS-REFERENCE TO RELATED APPLICATIONS

This application is a U.S. National Stage Application, which claims the benefit under 35 U.S.C. § 371 of International Patent Application No. PCT/JP2017/032314 filed on Sep. 7, 2017, which claims the foreign priority benefit under 35 U.S.C. § 119 of Japanese Patent Application No. 2016-207273, filed Oct. 21, 2016, the contents of which are incorporated herein by reference.

TECHNICAL FIELD

The present invention relates to a touch panel device.

BACKGROUND ART

There has been conventionally known a touch panel device that arranges a plurality of electrodes in a matrix shape and detects a pressing force of touch input (see e.g. Patent Document 1). There has been also known a method of detecting a pressing force of the touch input by incorporating a sensor for detecting the pressing force such as a piezoelectric element into a touch panel.

Moreover, there has been known a resistive film type touch panel that detects multi-touch (2-point) input (see e.g. Patent Document 2).

PRIOR ART DOCUMENT

Patent Document

[Patent Document 1] Japanese Laid-open Patent Publication No. 2015-41159
[Patent Document 2] Japanese Patent No. 5642500

SUMMARY OF THE INVENTION

Problems to be Solved by the Invention

The above-mentioned Document D1 discloses a method of detecting the pressing force when a single point of the touch panel is pressed, but does not disclose a method of detecting pressing forces of two points when the two points of the touch panel are pressed at the same time.

When a single sensor for detecting the pressing force is used, the single sensor cannot detect which of the two points of the touch panel is pressed strongly. When a plurality of sensors are used, the manufacturing cost of the touch panel increases and a complex control processing is required to control the plurality of sensors.

It is an object of the present invention to provide a touch panel device that can easily detect the pressing forces of the two points by multi-touch input at low cost.

Means for Solving the Problems

To achieve the above-mentioned object, a touch panel device disclosed herein characterized by comprising includes: a first resistive film in which a first electrode and a second electrode are provided at both ends in a first direction; a second resistive film in which a third electrode and a fourth electrode are provided at both ends in a second direction perpendicular to the first direction; a plurality of switches that are connected to the first to the fourth electrodes, respectively; a memory; and a processor coupled to the memory and is configured to: a first measurement means that controls control the switches so as to apply a voltage to the second electrode and ground the third electrode, and measures measure a voltage difference between the first electrode and the fourth electrode as a first pressing force; a second measurement means that controls control the switches so as to apply a voltage to the first electrode and ground the fourth electrode, and measures measure a voltage difference between the second electrode and the third electrode as a second pressing force; and an association means that associate associate the first pressing force and the second pressing force with coordinates of two contact points, respectively, and outputs output a result of the association to an external device.

Effects of the Invention

According to the present invention, it is possible to easily detect the pressing forces of the two points by multi-touch input at low cost.

BRIEF DESCRIPTION OF THE DRAWINGS

FIG. 7 is a diagram illustrating the format of touch data;
FIG. 10 is a diagram illustrating the format of the touch data.

MODES FOR CARRYING OUT THE INVENTION

Hereinafter, a description will be given of embodiments with drawings.

Figure 1A:
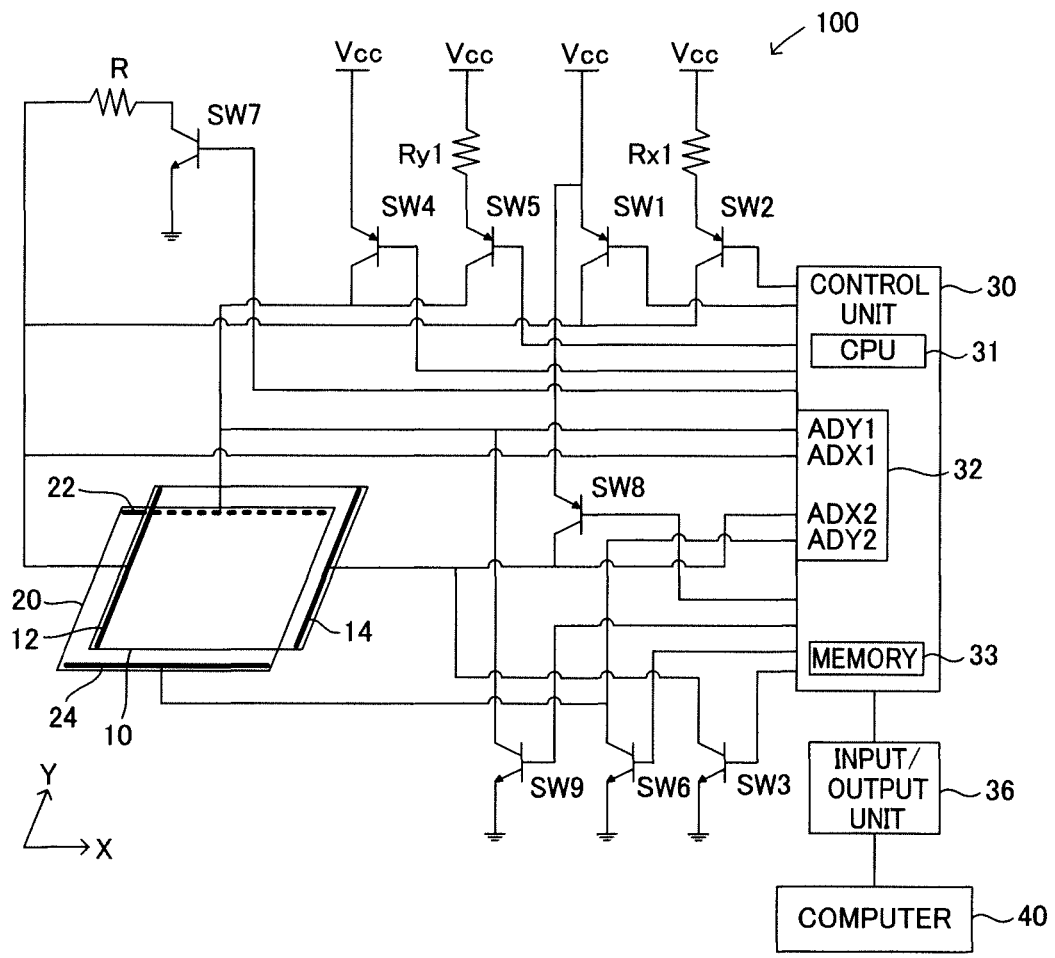
FIG. 1A is a diagram illustrating a touch panel device according to a present embodiment.

FIG. 1A is a diagram illustrating a touch panel device according to a present embodiment. A touch panel device 100 includes: switches SW1 to SW9; resistances R, Rx1 and Ry1; resistive films 10 and 20; a control unit 30; and an input/output unit 36, as illustrated in FIG. 1A. The resistive film 10 is an upper resistive film, and the resistive film 20 is a lower resistive film. The resistive films 10 and 20 are arranged opposite to each other, and superposed on a display device such as a liquid crystal display (not illustrated), for example. An XH electrode 12 (i.e., a first electrode) is provided on one side of the resistive film 10 (i.e., a first resistive film), and an XL electrode 14 (i.e., a second electrode) opposite to the XH electrode 12 is provided on another one side of the resistive film 10. A YH electrode 22 (i.e., a third electrode) is provided on one side of the resistive film 20 (i.e., a second resistive film), and a YL electrode 24 (i.e., a fourth electrode) opposite to the YH electrode 22 is provided on another one side of the resistive film 20. A direction (i.e., an X-axis direction) in which the XH electrode 12 and the XL electrode 14 are opposite to each other crosses, e.g. is perpendicular to a direction (i.e., a Y-axis direction) in which the YH electrode 22 and the YL electrode 24 are opposite to each other.

The resistive films 10 and 20 are transparent conductive films made of ITO (Indium Tin Oxide), for example. The resistive films 10 and 20 are formed by the same material, for example, and electrical resistance is substantially uniformly distributed. The XH electrode 12, the XL electrode 14, the YH electrode 22 and the YL electrode 24 are made of metal such as copper or aluminum, for example.

The switches SW1 to SW9 are made of transistors, respectively. A base of the transistor of each switch is connected to the control unit 30. Each emitter of the switches SW1, SW4 and SW8 is connected to a supply voltage Vcc. An emitter of the switch SW2 is connected to the supply voltage Vcc via the resistance Rx1. An emitter of the switch SW5 is connected to the supply voltage Vcc via the resistance Ry1. Each emitter of the switches SW3, SW6, SW7 and SW9 is grounded. The supply voltage Vcc is 5V, for example.

The XH electrode 12 is connected to collectors of the switches SW1 and SW2, and a collector of the switch SW7 via the resistance R. The XL electrode 14 is connected to collectors of the switches SW3 and SW8. The YH electrode 22 is connected to collectors of the switches SW4, SW5 and SW9. The YL electrode 24 is connected to a collector of the switch SW6.

The control unit 30 is connected to a computer 40 as an external device via the input/output unit 36. Data on the touch input acquired by the control unit 30 is transmitted to the computer 40 via the input/output unit 36.

The control unit 30 includes a Central Processing Unit (CPU) 31, an AD converter 32 and a memory 33. The CPU 31 is composed of a processor, and serves as a first measurement means, a second measurement means, an association means, a comparison means, and a detection means, a measurement means, and a calculation means. The AD converter 32 includes voltage detection units ADX1, ADX2, ADY1 and ADY2. The voltage detection units ADX1, ADX2, ADY1 and ADY2 serve as the first measurement means, the second measurement means and the measurement means. The voltage detection unit ADX1 is connected to the XH electrode 12, and the voltage detection unit ADX2 is connected to the XL electrode 14. The voltage detection unit ADY1 is connected to the YH electrode 22, and the voltage detection unit ADY2 is connected to the YL electrode 24. The memory 33 stores voltages detected by the voltage detection units ADX1, ADX2, ADY1 and ADY2, data necessary for coordinate detection, and so on.

An electrical resistance of the resistance Rx1 is substantially the same as the electrical resistance of the resistive film 10 between the XH electrode 12 and the XL electrode 14. The electrical resistance of the resistance Ry1 is substantially the same as the electrical resistance of the resistive film 20 between the YH electrode 22 and the YL electrode 24.

Figure 1B:
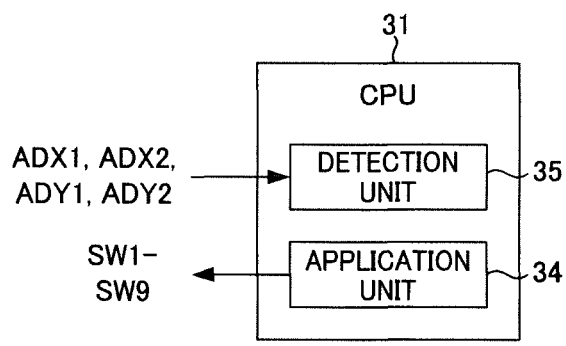
FIG. 1B is a functional block diagram illustrating functions of a CPU.

FIG. 1B is a functional block diagram illustrating functions of the CPU 31. The CPU 31 serves as an application unit 34 and a detection unit 35. The application unit 34 applies voltages to the switches SW1 to SW9 to control on/off of the switches SW1 to SW9, thereby controlling a voltage to be applied to each electrode. The detection unit 35 acquires the voltages detected by the voltage detection units ADX1, ADX2, ADY1 and ADY2, and detects whether the touch input is single point pressing or two point pressing, coordinates of a middle point in case of the two point pressing, a distance between the two points, a direction of a line connecting the two points, a pressing force of at least one contact point, and coordinates of the contact point, based on the acquired voltages.

Figure 2:
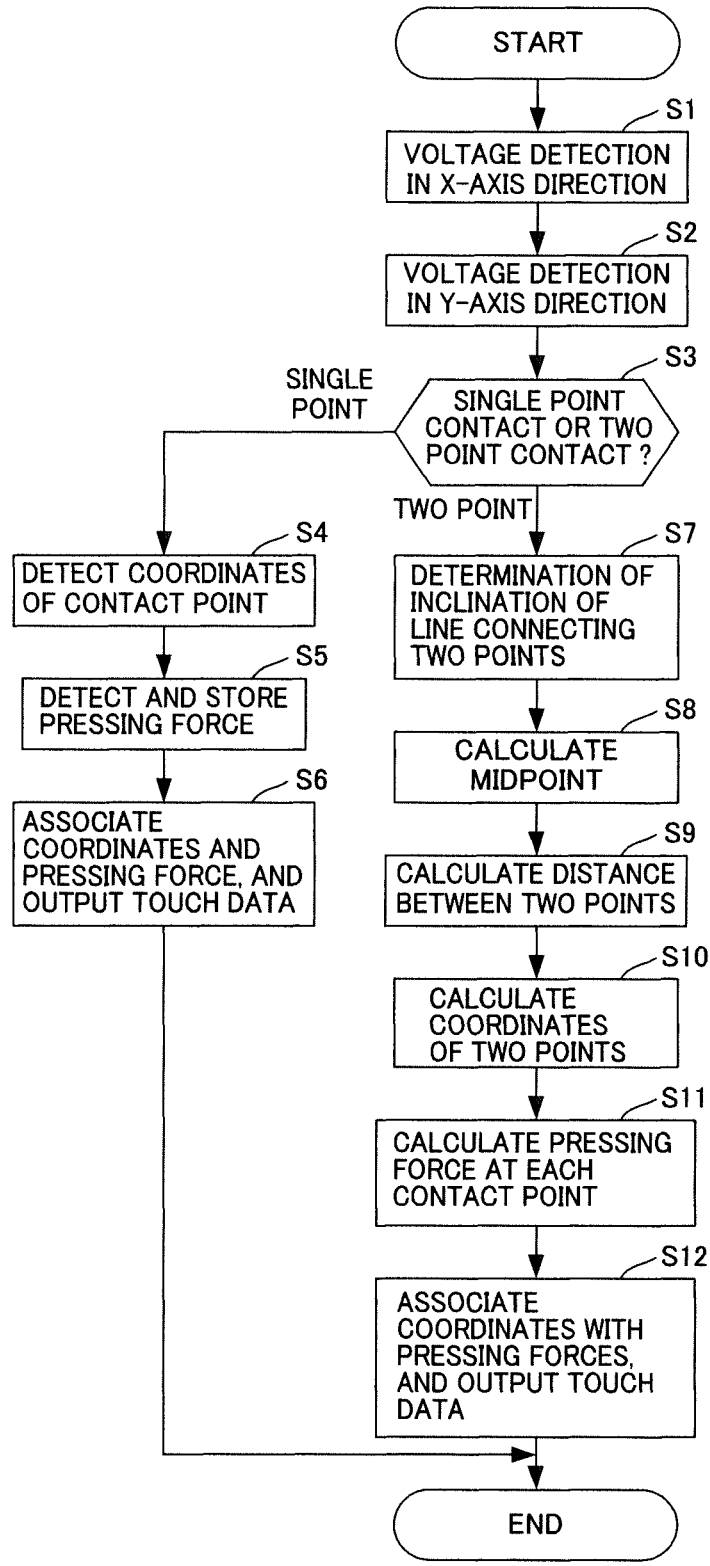
FIG. 2 is a flowchart illustrating a process to be executed by the CPU.

FIG. 2 is a flowchart illustrating a detection process of the contact point to be executed by the CPU 31.

First, the CPU 31 detects a voltage in the X-axis direction (step S1). Specifically, the CPU 31 turns on the switches SW2 and SW3, turns off other switches excluding them, and the voltage detection unit ADX1 measures the voltage. In this state, since the voltage of Vcc is applied to the XH electrode 12 through the resistance Rx1 and the XL electrode 14 is grounded, an electric potential distribution occurs in the X-axis direction of the resistive film 10. In this state, the voltage is measured by the voltage detection unit ADX1, and the measured voltage is stored into the memory 33. Here, the voltage to be detected by the voltage detection unit ADX1 is a value partially divided by the resistance Rx1 and a resistance component between the XH electrode 12 and the XL electrode 14.

Next, the CPU 31 detects a voltage in the Y-axis direction (step S2). Specifically, the CPU 31 turns on the switches SW5 and SW6, turns off other switches excluding them, and the voltage detection unit ADY1 measures the voltage. In this state, since the voltage of Vcc is applied to the YH electrode 22 through the resistance Ry1 and the YL electrode 24 is grounded, an electric potential distribution occurs in the Y-axis direction of the resistive film 20. In this state, the voltage is measured by the voltage detection unit ADY1, and the measured voltage is stored into the memory 33. Here, the voltage to be detected by the voltage detection unit ADY1 is a value partially divided by the resistance Ry1 and a resistance component between the YH electrode 22 and the YL electrode 24.

Next, the CPU 31 determines whether the contact point is a single point or two points (step S3). Specifically, the CPU 31 determines whether the voltage measured by the voltage detection unit ADX1 in step S1 and the voltage measured by the voltage detection unit ADY1 in step S2 are Vcc/2 or less than Vcc/2. When the voltages measured by the voltage detection units ADX1 and ADY1 are Vcc/2, the CPU 31 determines that the contact point is the single point. On the other hand, when the voltages measured by the voltage detection units ADX1 and ADY1 are less than Vcc/2, the CPU 31 determines that the contact point is the two points.

Figure 3A:
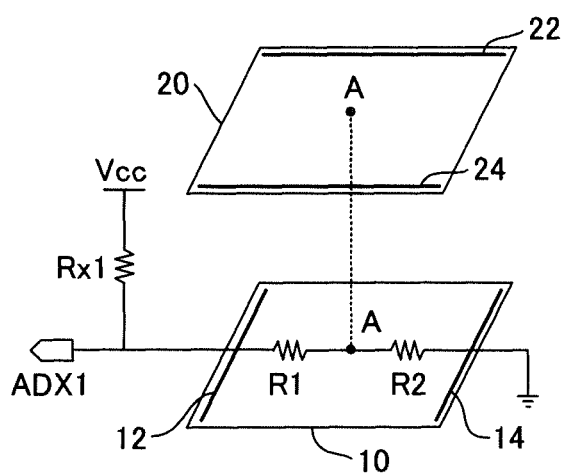
FIG. 3A is a diagram illustrating voltage detection by a voltage detection unit ADX1 at the time of single point contact.

When the contact point between the resistive films 10 and 20 is only a point A as illustrated in FIG. 3A, for example, the resistance value between the XH electrode 12 and the XL electrode 14 is a total value of resistance components R1 and R2, and the total value is substantially equal to a value of the resistance Rx1. Therefore, the voltage to be detected by the voltage detection unit ADX1 becomes Vcc/2.

Figure 3B:
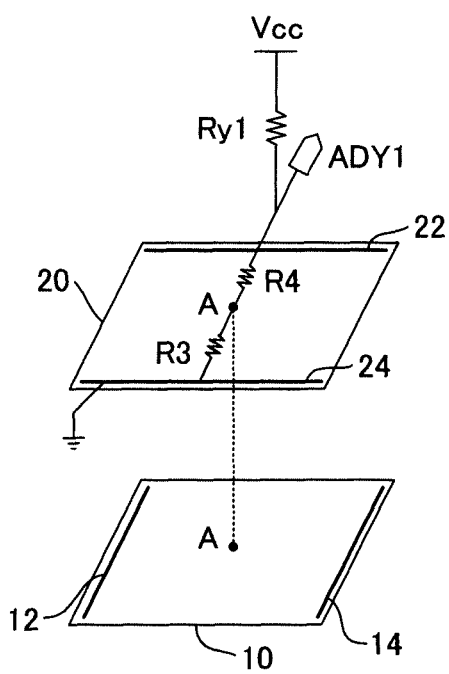
FIG. 3B is a diagram illustrating voltage detection by a voltage detection unit ADY1 at the time of the single point contact.

When the contact point between the resistive films 10 and 20 is only the point A as illustrated in FIG. 3B, the resistance value between the YH electrode 22 and the YL electrode 24 is a total value of resistance components R3 and R4, and the total value is substantially equal to a value of the resistance Ry1. Therefore, the voltage to be detected by the voltage detection unit ADY1 becomes Vcc/2.

Figure 3C:
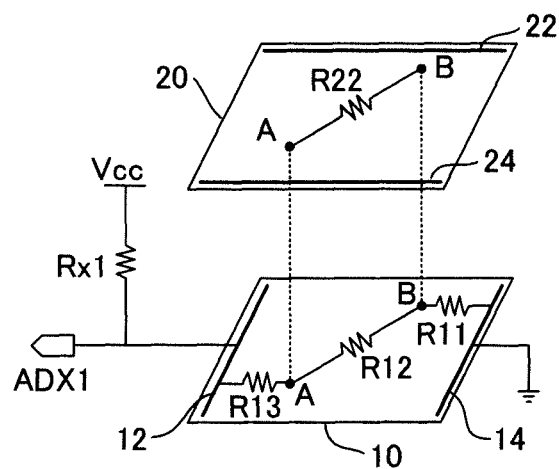
FIG. 3C is a diagram illustrating voltage detection by the voltage detection unit ADX1 at the time of two point contact.

On the other hand, when the contact point between the resistive films 10 and 20 is two points of a point A and a point B as illustrated in FIG. 3C, the resistance value between the XH electrode 12 and the XL electrode 14 is a synthetic resistance value of a resistance component R11, a resistance component in which a resistance component R12 and a resistance component R22 are connected in parallel, and a resistance component R13. Since a parallel resistance component of the resistance components R12 and R22 is included, the synthetic resistance value of FIG. 3C becomes lower than the resistance Rx1. Therefore, the voltage to be detected by the voltage detection unit ADX1 becomes lower than Vcc/2.

Figure 3D:
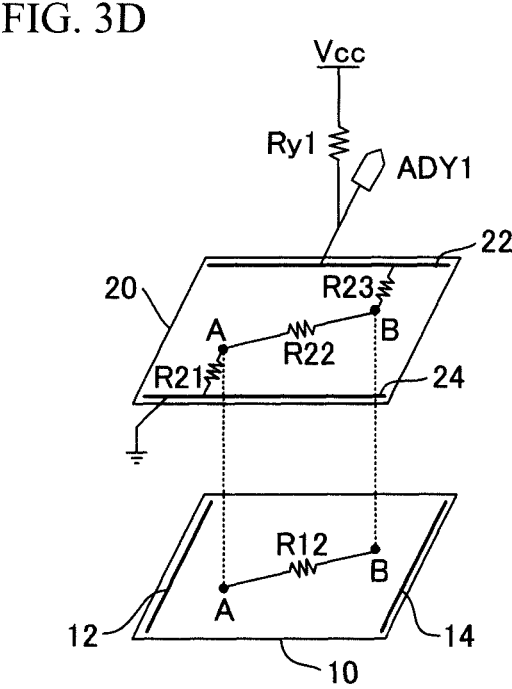
FIG. 3D is a diagram illustrating voltage detection by the voltage detection unit ADY1 at the time of the two point contact.

Moreover, when the contact point between the resistive films 10 and 20 is the two points of the point A and the point B as illustrated in FIG. 3D, the resistance value between the YH electrode 22 and the YL electrode 24 is a synthetic resistance value of a resistance component R21, a resistance component in which a resistance component R12 and a resistance component R22 are connected in parallel, and a resistance component R23. Therefore, the synthetic resistance value of FIG. 3D becomes lower than the resistance Ry1. Therefore, the voltage to be detected by the voltage detection unit ADY1 becomes lower than Vcc/2.

Next, when it is determined in step S3 that the contact point is the single point, the CPU 31 detects the coordinates of the contact point by a normal position detection method (step S4). The CPU 31 turns on the switches SW1 and SW3, turns off other switches excluding them, and detects an X-coordinate of the contact point based on the voltage measured by the voltage detection unit ADX1. At this time, the CPU 31 calculates a distance in the X-axis direction from the XH electrode 12 to the contact point by multiplying the voltage measured by the voltage detection unit ADX1 by a ratio of a distance between the XH electrode 12 and the XL electrode 14 to an electric potential difference between the XH electrode 12 and the XL electrode 14, for example. Moreover, the CPU 31 turns on the switches SW4 and SW6, turns off other switches excluding them, and detects a Y-coordinate of the contact point based on the voltage measured by the voltage detection unit ADY1. Here, the CPU 31 calculates a distance in the Y-axis direction from the YH electrode 22 to the contact point by multiplying the voltage measured by the voltage detection unit ADY1 by a ratio of a distance between the YH electrode 22 and the YL electrode 24 to an electric potential difference between the YH electrode 22 and the YL electrode 24.

Next, the CPU 31 turns on the switches SW8 and SW9, turns off other switches excluding them, detects an electric potential difference between the voltage measured by the voltage detection unit ADX1 and the voltage measured by the voltage detection unit ADY2, i.e., a voltage applied to a contact resistance of the contact point, and stores the detected potential difference into the memory 33 as the pressing force (step S5).

Then, the CPU 31 associates the coordinates of the contact point detected in step S4 and the electric potential difference detected in step S5 to create touch data and output the touch data to the computer 40 via the input/output unit 36 (step S6). The present process is terminated.

On the other hand, when it is detected in step S3 that the contact point is the two points, the CPU 31 determines whether the inclination of the line connecting the two points is parallel to the X-axis or Y-axis direction, or a diagonal direction (step S7).

As an initial process, in a state where the contact point is 0 or 1, the CPU 31 turns on the switches SW2 and SW3 and turns off other switches excluding them to generate an electrical potential distribution in the X-axis direction of the resistive film 10, and the voltage detection unit ADX1 measures the voltage. The CPU 31 stores the voltage measured by the voltage detection unit ADX1 into the memory 33 as an initial voltage α1. Similarly, in the state where the contact point is 0 or 1, the CPU 31 turns on the switches SW5 and SW6 and turns off other switches excluding them to generate an electrical potential distribution in the Y-axis direction of the resistive film 20, and the voltage detection unit ADY1 measures the voltage. The CPU 31 stores the voltage measured by the voltage detection unit ADY1 into the memory 33 as an initial voltage α2. Such a setting of the initial voltage can be carried out at appropriate timing such as when the device is began to use or is manufactured, for example.

The CPU 31 determines whether the line connecting the two points is parallel to the X-axis or Y-axis direction, or the diagonal direction with respect to the X-axis direction or Y-axis direction, by comparing the voltages measure in steps S1 and S2 with the stored initial voltages α1 and α2.

When the voltage measured in step S1 is lower than the initial voltages α1 and the voltage measured in step S2 is substantially equal to the initial voltages α2, the CPU 31 determines that the line connecting the two points is parallel to the X-axis direction. When the voltage measured in step S1 is substantially equal to the initial voltages α1 and the voltage measured in step S2 is lower than the initial voltages α2, the CPU 31 determines that the line connecting the two points is parallel to the Y-axis direction. Moreover, when the voltage measured in step S1 is lower than the initial voltages α1 and the voltage measured in step S2 is lower than the initial voltages α2, the CPU 31 determines that the line connecting the two points is the diagonal direction.

Moreover, in order to determine whether the inclination of the line connecting the two points is an upper right direction toward the point B close to the XL electrode 14 and the YH electrode 22 from the point A close to the XH electrode 12 and the YL electrode 24, or a lower right direction toward the point B close to the XL electrode 14 and the YL electrode 24 from the point A close to the XH electrode 12 and the YH electrode 22, the CPU 31 turns on the switches SW1 and SW3 and turns off other switches excluding them to generate an electrical potential distribution in the X-axis direction of the resistive film 10, and the voltage detection units ADY1 and ADY2 measure the voltages. When the voltage detected by the voltage detection unit ADY1 is lower than the voltage detected by the voltage detection unit ADY2, the CPU 31 determines that the inclination of the line connecting the two points is upward to the right. On the other hand, when the voltage detected by the voltage detection unit ADY1 is higher than the voltage detected by the voltage detection unit ADY2, the CPU 31 determines that the inclination of the line connecting the two points is upward to the left.

Next, the CPU 31 calculates midpoint coordinates of the two points (step S8). Specifically, the CPU 31 turns on the switches SW1 and SW3 and turns off other switch excluding them to generate the electrical potential distribution in the X-axis direction of the resistive film 10, and the voltage detection units ADY1 and ADY2 measure the voltages. The CPU 31 acquires a voltage in the X-axis direction corresponding to the midpoint of the two points by calculating an average value of the voltage detected by the voltage detection unit ADY2 and the voltage detected by the voltage detection unit ADY1, and acquires an X-coordinate of the midpoint based on the acquired voltage in the X-axis direction. For example, the CPU 31 acquires a distance in the X-axis direction from the XH electrode 12 by multiplying the above-mentioned calculated average value by a ratio of the distance between the XH electrode 12 and the XL electrode 14 to the electric potential difference between the voltage detected by the voltage detection unit ADY1 and the voltage detected by the voltage detection unit ADY2.

Similarly, the CPU 31 turns on the switches SW4 and SW6 and turns off other switch excluding them to generate the electrical potential distribution in the Y-axis direction of the resistive film 20, and the voltage detection units ADX1 and ADX2 measure the voltages. The CPU 31 acquires a voltage in the Y-axis direction corresponding to the midpoint of the two points by calculating an average value of the voltage detected by the voltage detection unit ADX1 and the voltage detected by the voltage detection unit ADX2, and acquires a Y-coordinate of the midpoint based on the acquired voltage in the Y-axis direction. For example, the CPU 31 acquires a distance in the Y-axis direction from the YH electrode 22 by multiplying the above-mentioned calculated average value by a ratio of the distance between the YH electrode 22 and the YL electrode 24 to the electric potential difference between the voltage detected by the voltage detection unit ADX1 and the voltage detected by the voltage detection unit ADX2.

Next, the CPU 31 calculates the distance between the two points (step S9). Specifically, the CPU 31 calculates the distance between the two points in contact with the touch panel device 100, based on the voltages measured in steps S1 and S2.

Figure 4:
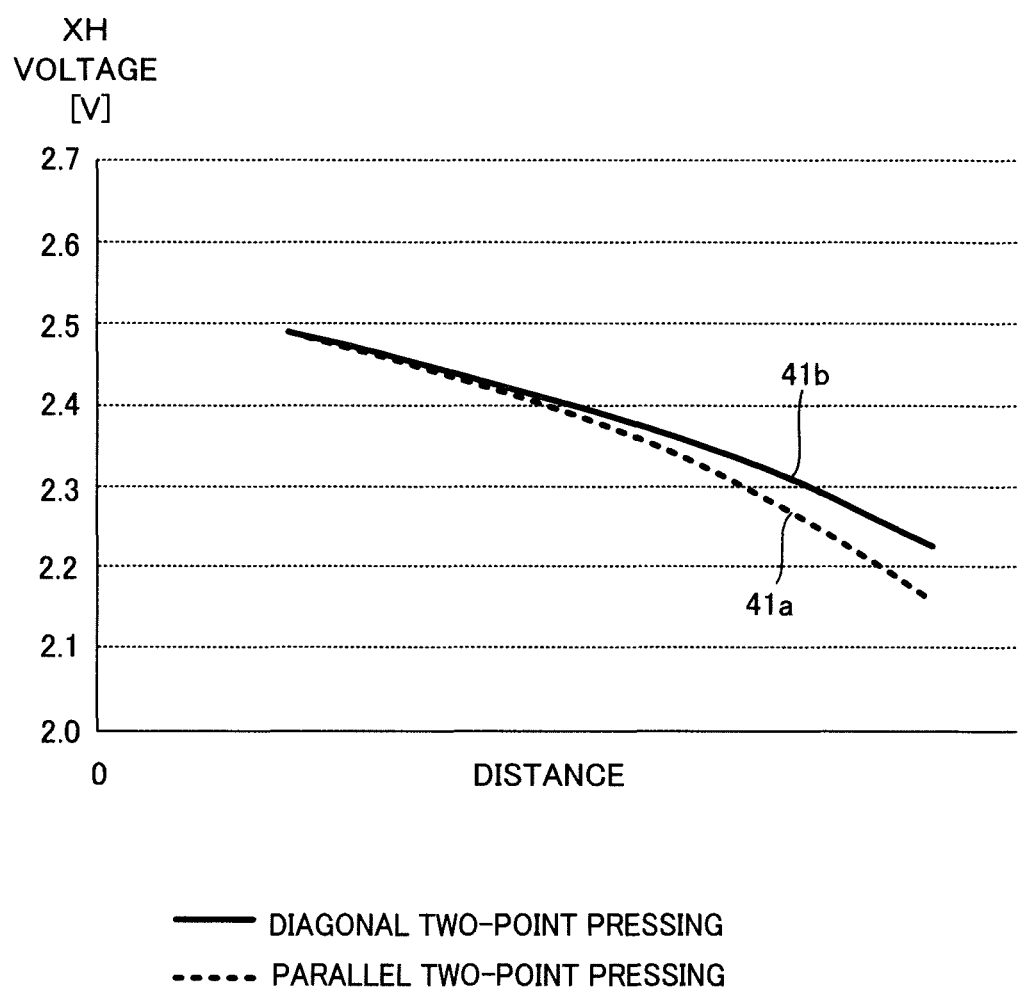
FIG. 4 is a diagram illustrating distance calculation data indicating a relationship between a distance between two points in an X-axis direction, and a voltage to be detected by the voltage detection unit ADX1.

FIG. 4 is a diagram illustrating distance calculation data indicating a relationship between the distance between the two points in the X-axis direction, and the voltage to be detected by the voltage detection unit ADX1. The distance calculation data is stored into the memory 33.

As the distance between the two points spreads as illustrated in FIG. 4, the value of the voltage to be detected by the voltage detection unit ADX1 is decreased. Moreover, compared a case where the two points are present in a direction to which the voltage is applied, i.e., in a direction parallel to the X-axis direction, with a case where the two points are not in the direction parallel to the X-axis direction, i.e., the two points are present in the right upward direction or left upward direction, relationships between the distance between the two points and the voltage to be detected by the voltage detection unit ADX1 are different from each other.

Therefore, the CPU 31 can select the relationship between the distance between the two points and the voltage detected by the voltage detection unit ADX1 as illustrated in FIG. 4, in accordance with a positional relationship of the two points detected in step S6, i.e., the inclination of the line connecting the two points, and can acquire the distance between the two points in the X-axis direction based on the selected relationship.

Specifically, when the two points are present on a straight line parallel to the X-axis direction, the CPU 31 can calculate the distance between the two points in the X-direction based on a curve indicated by a line 41*a* in FIG. 4 and the voltage detected by the voltage detection unit ADX1. On the other hand, when the two points are not present on the straight line parallel to the X-axis direction but present on a right or left upward straight line, the CPU 31 can calculate the distance between the two points in the X-direction based on a curve indicated by a line 41*b* in FIG. 4 and the voltage detected by the voltage detection unit ADX1.

Here, the memory 33 also includes distance calculation data indicating a relationship between the distance between the two points in the Y-axis direction, and the voltage to be detected by the voltage detection unit ADY1. By the similar method to the X-axis direction, the CPU 31 can acquire the distance between the two points in the Y-axis direction, based on the distance calculation data indicating the relationship between the distance between the two points in the Y-axis direction and the voltage to be detected by the voltage detection unit ADY1, and the voltage detected by the voltage detection unit ADY1.

Next, the CPU 31 calculates respective coordinates of the two points (step S10). The CPU 31 calculates respective coordinates of the two points based on the positional relationship of the two points (the inclination of the line connecting the two points), the position of the midpoint of the two points and the distance between the two points.

Specifically, when the distance between the two points in the X-axis direction is calculated as Lx, the distance between the two points in the Y-axis direction is calculated as Ly and the midpoint coordinates of the two points are calculated as (Xc, Xy), the coordinates of the two points are represented by any one of the following formulas (1) to (4). Here, the formula (1) indicates a case where the two points are present on the right upward straight line, the formula (2) indicates a case where the two points are present on the left upward straight line, the formula (3) indicates a case where the two points are present on the straight line in the X-direction and the formula (4) indicates a case where the two points are present on the straight line in the Y-direction.

$$(Xc+Lx/2, Yc+Ly/2), (Xc-Lx/2, Yc-Ly/2) \quad (1)$$

$$(Xc+Lx/2, Yc-Ly/2), (Xc-Lx/2, Yc+Ly/2) \quad (2)$$

$$(Xc+Lx/2, Yc), (Xc-Lx/2, Yc) \quad (3)$$

$$(Xc, Yc+Ly/2), (Xc, Yc-Ly/2) \quad (4)$$

Figure 5:
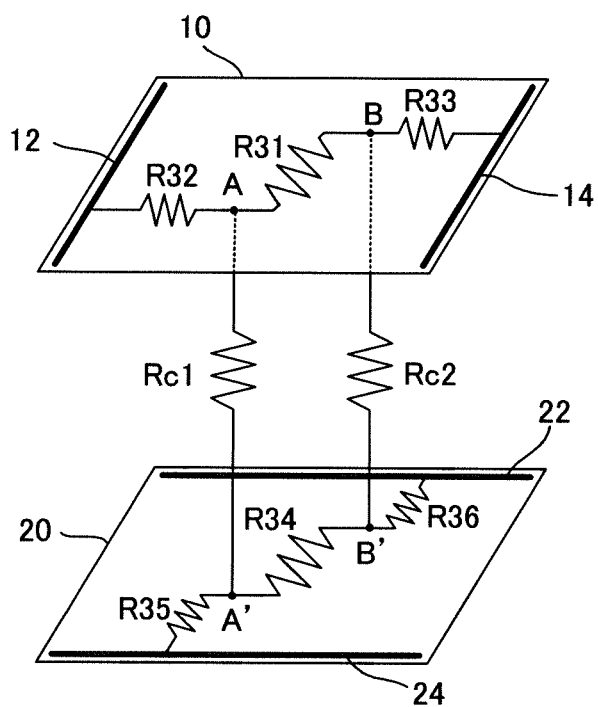
FIG. 5 is a diagram illustrating a state where the two points are pressed in the touch panel device.

Next, the CPU 31 calculates the pressing force at each contact point (step S11). FIG. 5 is a diagram illustrating a state where the two points are pressed in the touch panel device 100. It is assumed that a first contact point in the resistive film 10 is a point A and a second contact point is a point B. It is also assumed that a first contact point in the resistive film 20 is a point A' and a second contact point is a point B'. It is assumed that a resistance between the points A and B on the resistive film 10 is R31, a resistance between the XH electrode 12 and the point A is R32 and a resistance between the XL electrode 14 and the point B is R33. It is also assumed that a resistance between the points A' and B' on the resistive film 20 is R34, a resistance between the YL electrode 24 and the point A' is R35 and a resistance between the YH electrode 22 and the point B' is R36. Moreover, it is assumed that a contact resistance between the point A in the resistive film 10 and the point A' in the resistive film 20 is Rc1, and a contact resistance between the point B in the resistive film 10 and the point B' in the resistive film 20 is Rc2.

Figure 6A:
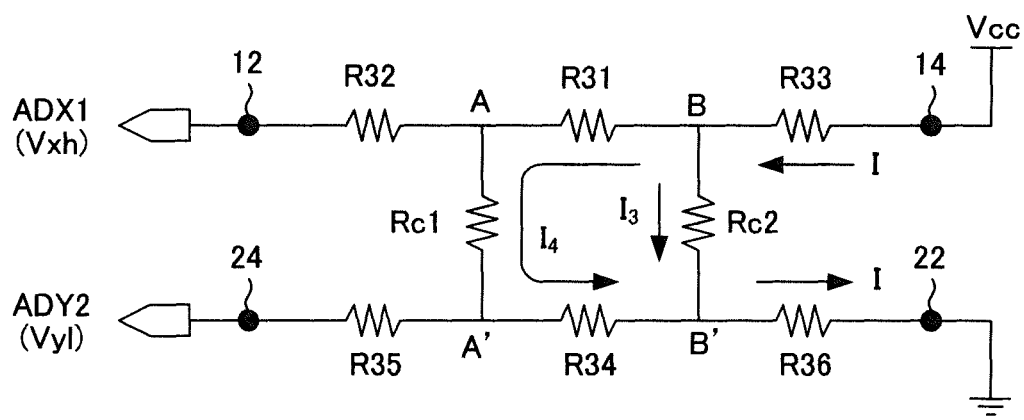
FIG. 6A is a diagram illustrating an equivalent circuit when a supply voltage Vcc is applied to an XL electrode and a YH electrode is grounded.

The CPU 31 turns on the switches SW8 and SW9 and turns off other switches excluding them to apply the supply voltage Vcc to the XL electrode 14 and ground the YH electrode 22. An equivalent circuit in this case is illustrated in FIG. 6A. In FIG. 6A, the resistances R32 and R35 become probes. Therefore, the voltage detection unit ADX1 and the voltage detection unit ADY2 measure the voltage values, so that the CPU 31 can acquire a voltage difference between both ends of the contact resistance Rc1 between the contact point A and the point A'. The CPU 31 stores the voltage difference appearing between both ends of the contact resistance Rc1 into the memory 33 as the pressing force.

When it is assumed that the voltage value to be detected by the voltage detection unit ADX1 is Vxh, the voltage value to be detected by the voltage detection unit ADY2 is Vy1 and the voltage difference between both ends of the contact resistance Rc1 is ΔV1, the ΔV1 is calculated by the following formula.

$$\Delta V1 = Vxh - Vyl$$
$$= \{I \cdot R36 + I4(Rcl + R34)\} - \{I \cdot R36 + I4 \cdot R34\}$$
$$= I4 \cdot Rcl$$

That is, the voltage difference ΔV1 (=I4·Rc1) is stored into the memory 33 as the pressing force of the first contact point.

Figure 6B:
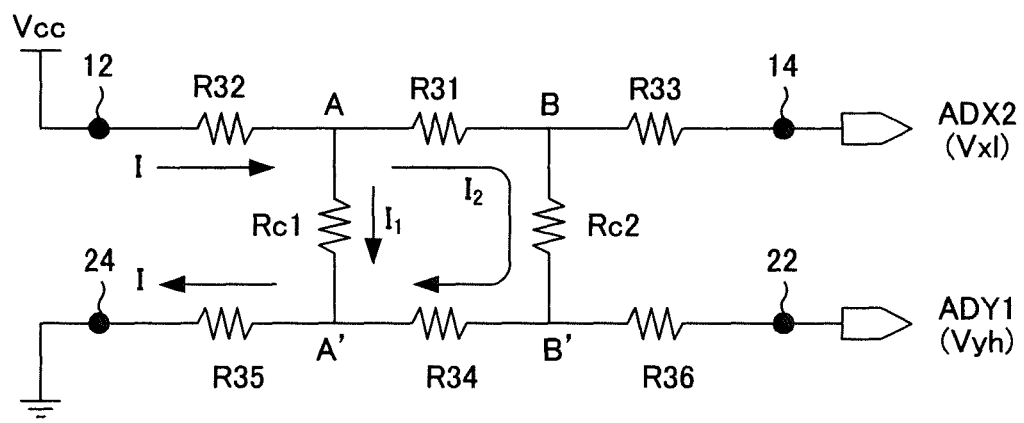
FIG. 6B is a diagram illustrating an equivalent circuit when the supply voltage Vcc is applied to an XH electrode and a YL electrode is grounded.

Next, the CPU 31 turns on the switches SW1 and SW6 and turns off other switches excluding them to apply the supply voltage Vcc to the XH electrode 12 and ground the YL electrode 24. An equivalent circuit in this case is illustrated in FIG. 6B. In FIG. 6B, the resistances R33 and R36 become probes. Therefore, the voltage detection unit ADX2 and the voltage detection unit ADY1 measure the voltage values, so that the CPU 31 can acquire a voltage difference between both ends of the contact resistance Rc2 between the contact point B and the point B'. The CPU 31 stores the voltage difference between both ends of the contact resistance Rc2 into the memory 33 as the pressing force.

When it is assumed that the voltage value to be detected by the voltage detection unit ADX2 is Vx1, the voltage value to be detected by the voltage detection unit ADY1 is Vyh and the voltage difference between both ends of the contact resistance Rc2 is ΔV2, the ΔV2 is calculated by the following formula.

$$\Delta V2 = Vxl - Vyh$$
$$= \{I \cdot R35 + I2(Rc2 + R34)\} - \{I \cdot R35 + I2 \cdot R34\}$$
$$= I2 \cdot Rc2$$

That is, the voltage difference ΔV2 (=I2·Rc2) is stored into the memory 33 as the pressing force of the second contact point.

Here, a description will be given of a reason why the voltage difference ΔV1 appearing between both ends of the contact resistor Rc1 and the voltage difference ΔV2 appearing between both ends of the contact resistor Rc2 can be measured as the pressing forces. When the point A of FIG. 5 is strongly pressed for example, a contact area between the resistive film 10 and the resistive film 20 increases. Therefore, the value of the contact resistor Rc1 reduces, and the voltage difference ΔV1 between both ends of the contact resistor Rc1 also reduces. Accordingly, as the pressing force increases, the voltage difference ΔV1 appearing between both ends of the contact resistor Rc1 reduces. Thus, since the pressing force and the voltage difference ΔV1 (or voltage difference ΔV2) correspond to one-to-one relationship, it is possible to measure the voltage difference ΔV1 (or voltage difference ΔV2) as the pressing force.

Next, the CPU 31 creates touch data associating the coordinates of the two points calculated in step S10 with the pressing forces at the respective contact points calculated in step S11, and outputs the touch data to the computer 40 via the input/output unit 36 (step S12). The present process is terminated.

Here, a description will be given of association between the coordinates of the two points and the respective pressing forces.

When it is determined in step S7 that the line connecting the two points is parallel to the X-axis direction, the CPU 31 associates the voltage difference ΔV1 appearing between both ends of the contact resistance Rc1 with the coordinates of a single point close to the XH electrode 12 among the two points, and associates the voltage difference ΔV2 appearing between both ends of the contact resistance Rc2 with the coordinates of a single point close to the XL electrode 14 among the two points. On the other hand, when it is determined in step S7 that the line connecting the two points is parallel to the Y-axis direction, the CPU 31 associates the voltage difference ΔV1 appearing between both ends of the contact resistance Rc1 with the coordinates of a single point close to the YL electrode 24 among the two points, and associates the voltage difference ΔV2 appearing between both ends of the contact resistance Rc2 with the coordinates of a single point close to the YH electrode 22 among the two points. Moreover, when it is determined in step S7 that the line connecting the two points is the diagonal direction, as with the case where it is determined that the line connecting the two points is parallel to the X-axis direction, the CPU 31 associates the coordinates of the two points with the respective pressing forces.

FIG. 7 is a diagram illustrating the format of the touch data. The touch data which the CPU 31 creates is output to the computer 40 for each touch-on and each touch-off of the touch panel. Moreover, the touch data includes, for each contact point, a contact number that is an identifier of the contact point, on/off information indicating either touch-on or touch-off, and information on the X-coordinate, the Y-coordinate and the pressing force. When the touch input of the two points is performed, the CPU 31 creates the touch data of the first contact point and the touch data of the second contact point to output these touch data to the computer 40.

Figure 8:
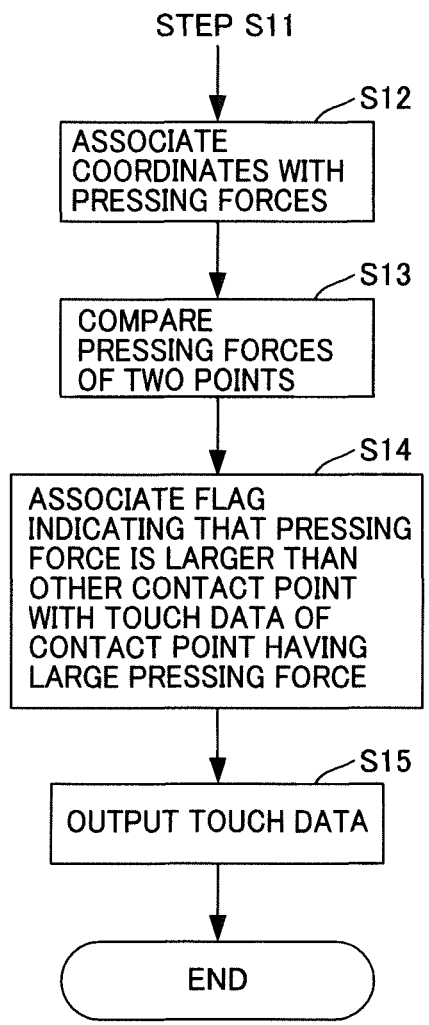
FIG. 8 is a flowchart illustrating a first variation of the process to be executed by the CPU.

FIG. 8 is a flowchart illustrating a first variation of the process to be executed by the CPU 31. The process of steps S1 to S11 is identical with the process of steps S1 to S11 in FIG. 2, and a description thereof is omitted.

In step S12 of FIG. 8, the CPU 31 associates the coordinates of the two points calculated in step S10 with the pressing forces at the respective contact points calculated in step S11. Then, the CPU 31 compares the pressing forces of the two points with each other (step S13), and sets a flag indicating that the pressing force is larger than the other contact point to the touch data of the contact point with a large pressing force (step S14). In this case, the touch data includes the coordinates and the pressing force of the contact point and the flag of step S14. On the other hand, such a flag is not set to the touch data of the contact point with a small pressing force. The CPU 31 outputs the created touch data to the computer 40 via the input/output unit 36 (step S15). The present process is terminated.

According to the present process, the computer 40 which has received the touch data can determine the contact point pressed strongly among the two contact points.

Figure 9:
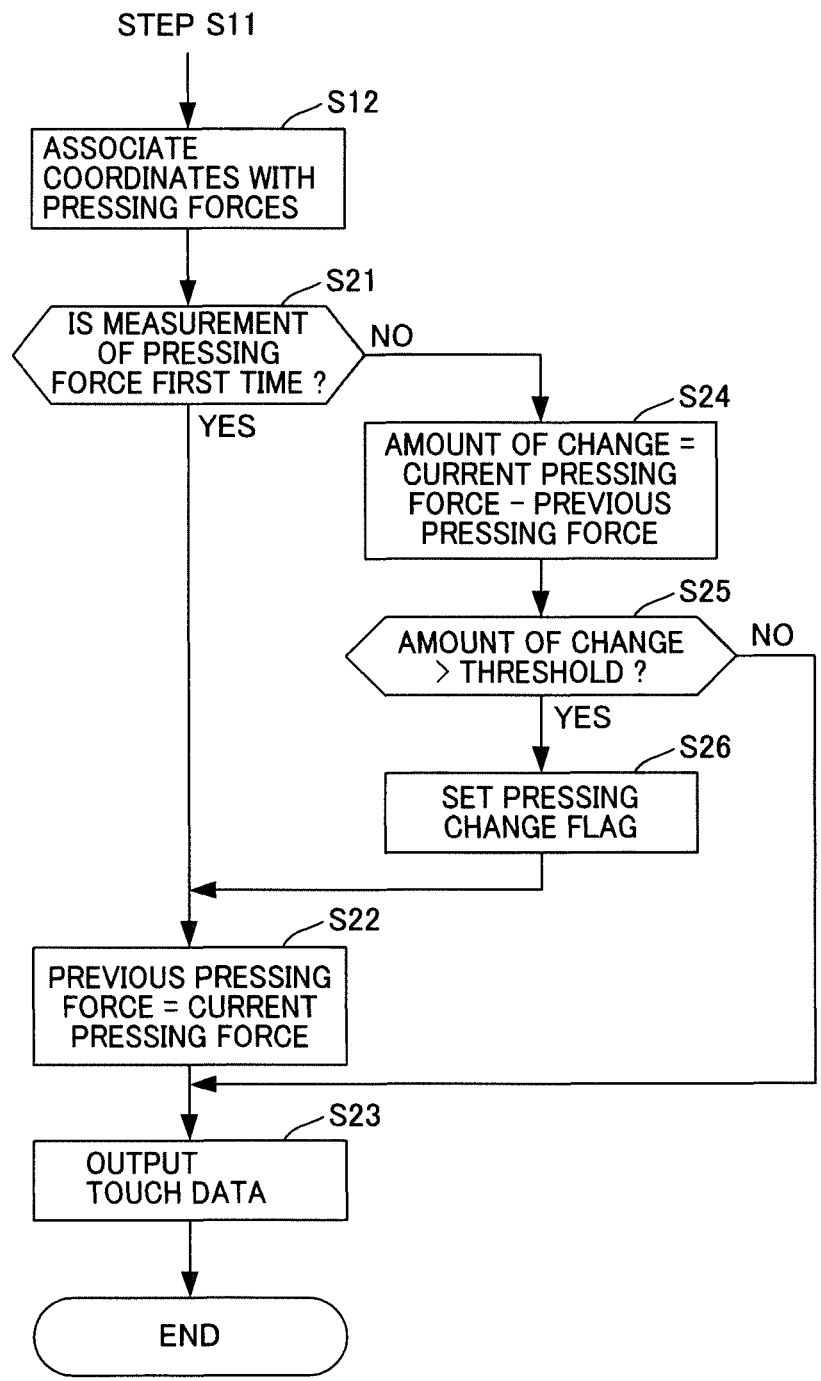
FIG. 9 is a flowchart illustrating a second variation of the process to be executed by the CPU.

FIG. 9 is a flowchart illustrating a second variation of the process to be executed by the CPU 31. The process of steps S1 to S11 is identical with the process of steps S1 to S11 in FIG. 2, and a description thereof is omitted.

In above-mentioned step S12, the CPU 31 associates the coordinates of the two points calculated in step S10 with the pressing forces at the respective contact points calculated in step S11. Then, the CPU 31 determines whether the measurement of the pressing force is the first time, in other words, determines whether the pressing force of the contact point has already been measured (step S21).

When the measurement of the pressing force is the first time (YES in step S21), the CPU 31 stores a current pressing force calculated in step S11 into the memory 33 as a previous pressing force (step S22). The CPU 31 outputs the touch data to the computer 40 via the input/output unit 36 (step S23). The present process is terminated.

When the measurement of the pressing force is not the first time, i.e., the pressing force of the contact point has already been measured (NO in step S21), the CPU 31 calculates an amount of change in the pressing force by subtracting the previous pressing force stored into the memory 33 from the current pressing force calculated in step S11 (step S24). Next, the CPU 31 determines whether the amount of change in the pressing force exceeds a preset threshold (step S25). When the amount of change in the pressing force exceeds the threshold (YES in step S25), the CPU 31 sets a pressing change flag indicating that the pressing force has changed, i.e., a pressing change flag indicating that the amount of change in the pressing force has exceeded the threshold, to the touch data (step S26). FIG. 10 illustrates an example of the format of the touch data to which the pressing change flag is set. In step S26, the touch data may include the pressing change flag, the current pressing force, the coordinates of the contact point, and the amount of change in the pressing force. That is, the CPU 31 may associate the pressing change flag, the current pressing force and the amount of change in the pressing force with the coordinates of the contact point, and output the associated data to the computer 40. Then, the procedure advances to step S22. On the other hand, when the amount of change in the pressing force does not exceed the threshold (NO in step S25), the procedure advances to step S23. In this case, the pressing change flag is not set to the touch data. Here, the process of steps S21 to S26 is performed for each contact point.

According to the present process, the computer 40 which has received the touch data can determine whether each contact point is strongly pressed based on the presence or absence of the pressing change flag. When a button is displayed on the monitor placed under the touch panel device 100 and the operator touches the button, the computer can determine whether the operation of pressing the button is performed by determining the change in the pressing force of the button with reference to the pressing change flag of the touch data received from the touch panel. This makes it possible to perform the process of confirming the button pressing.

Figure 11:
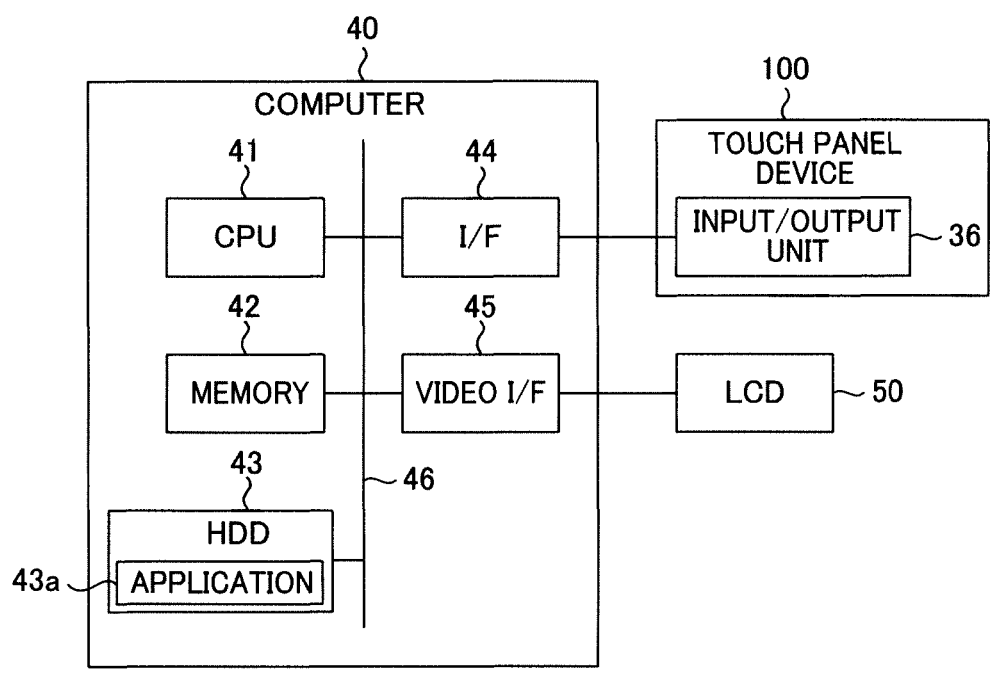
FIG. 11 is a block diagram illustrating the configuration of a computer.

FIG. 11 is a block diagram illustrating the configuration of the computer 40.

The computer 40 includes: a CPU 41 that controls the whole operation; a memory 42 that stores data; a hard disk drive (HDD) 43 that stores an application 43*a*; an interface (I/F) 44 that communicates with the input/output unit 36 of the touch panel device 100; and a video I/F 45 that connects with a display device (LCD) 50. The CPU 41 is connected to the memory 42, the HDD 43, the I/F 44 and the video I/F 45 via a bus 46. The CPU 41 receives the touch data from the input/output unit 36 of the touch panel device 100 via the I/F 44. The CPU 41 runs the application 43*a* and executes a prescribed process. The LCD 50 is disposed directly below the resistive films 10 and 20 of the touch panel device 100. The operator views a screen of the LCD 50 through the resistive films 10 and 20.

Here, for example, an operation when the operator moves an object displayed on the screen of the LCD 50 and rotates the object is assumed.

Conventionally, the operator drags the object with a finger to move the finger to a position where the screen scrolling is started. Then, at the time of moving the object to a desired position, the operator moves the finger again to a position that does not perform the screen scrolling in order to release the scroll. Next, the operator performs a rotational operation of the object in order to place the object in a desired direction. In this case, it is necessary to move the finger in a direction opposite to a direction in which the object is moved for the completion of the screen scroll, and an intuitive operation is difficult.

In contrast, when the operation of the screen scrolling is assigned to the pressing force of the present embodiment, the operation is as follows. The operator drags the object with two fingers and strongly presses a point of a position corresponding to a direction in which the operator wants to move the object, which makes it possible to move the object. In this case, the computer determines the direction in which the operator wants to move the object based on a magnitude relationship of the pressing forces at the two contact points. Further, after moving the object to a desired position, the operator returns the pressing force to an original state and performs an operation of rotating the object. In this case, the computer determines the change of the pressing forces at the two contact points, and can determine that the movement of the object is no longer required. Thus, in the present embodiment as compared with the conventional method, the operation in the opposite direction is not generated and a continuous operation is achieved, and it is therefore possible to perform more intuitive operation.

Then, the application 43*a* assigns the pressing force at the contact point in the touch panel device 100 to the input in the Z-axis direction, which makes it possible to move the object in not only the X-axis direction and the Y-axis direction, but also the Z-axis direction. Moreover, the application 43*a* can also assigns the pressing force input from the touch panel device 100 to the rotational operation of the object.

Thus, outputting the pressing force from the touch panel device 100 can increase a type of input method of the touch panel device 100 and further can improve the operability of the touch panel device 100.

As described above, according to the present embodiment, when the resistive film 10 is in contact with the resistive film 20 at the two points, the CPU 31 of the touch panel device 100 controls the plurality of switches so as to apply the voltage to the XL electrode 14 and ground the YH electrode 22, measures the voltage difference between the XH electrode 12 and the YL electrode 24 as a first pressing force (step S11), controls the plurality of switches so as to apply the voltage to the XH electrode 12 and ground the YL electrode 24, measures the voltage difference between the XL electrode 14 and the YH electrode 22 as a second pressing force (step S11), associates the first pressing force and the second pressing forces with the coordinates of the two points, respectively, and outputs the associated data to the computer 40 (step S12). Therefore, it is possible to easily detect the pressing forces of the two points by the multi-touch input at low cost.

The present invention is not limited to these specifically described embodiments but may have various variations and alterations within the scope of the claimed invention.

The invention claimed is:

1. A touch panel device comprising:
   a first resistive film in which a first electrode and a second electrode are provided at both ends in a first direction;
   a second resistive film in which a third electrode and a fourth electrode are provided at both ends in a second direction perpendicular to the first direction;
   a plurality of switches that are connected to the first to the fourth electrodes, respectively;
   a memory; and
   a processor coupled to the memory and configured to:
   control the switches so as to apply a voltage to the second electrode and ground the third electrode, and measure a voltage difference between the first electrode and the fourth electrode as a first pressing force corresponding to one of two contact points;
   control the switches so as to apply a voltage to the first electrode and ground the fourth electrode, and measure a voltage difference between the second electrode and the third electrode as a second pressing force corresponding to the other of the two contact points; and
   associate the first pressing force and the second pressing force with coordinates of the two contact points, respectively, and output a result of the association to an external device.

2. The touch panel device according to claim 1, wherein when an inclination of a line connecting the two contact points is parallel to the first direction, or a diagonal direction that is not parallel to the first direction and the second direction, the processor associates coordinates of a single contact point close to the first electrode among the two contact points with the first pressing force, and associates coordinates of another single contact point close to the second electrode among the two contact points with the second pressing force,
   when the inclination of the line connecting the two contact points is parallel to the second direction, the processor associates coordinates of a single contact point close to the fourth electrode among the two contact points with the first pressing force, and associates coordinates of another single contact point close to the third electrode among the two contact points with the second pressing force.

3. The touch panel device according to claim 1, wherein the processor compares magnitudes of the first pressing force and the second pressing force, and
   wherein the processor associates a flag indicating having a larger pressing force than another contact point with the coordinates of the contact point having the larger pressing force among the two contact points, and outputs the result of the association to the external device.

4. The touch panel device according to claim 1, wherein the processor detects an amount of change in the first pressing force and an amount of change in the second pressing force;
   when the amount of change in the first pressing force exceeds a threshold, the processor associates a flag indicating that the amount of change in the first pressing force exceeds the threshold with the coordinates of the contact point with which the first pressing force is associated, and outputs the result of the association to the external device, and
   when the amount of change in the second pressing force exceeds the threshold, the processor associates a flag indicating that the amount of change in the second pressing force exceeds the threshold with the coordinates of the contact point with which the second pressing force is associated, and outputs the result of the association to the external device.

5. A touch panel device comprising:
   a first resistive film in which a first electrode and a second electrode are provided at both ends in a first direction;
   a second resistive film in which a third electrode and a fourth electrode are provided at both ends in a second direction perpendicular to the first direction;
   a plurality of switches that are connected to the first to the fourth electrodes, respectively;
   a memory; and
   a processor coupled to the memory and configured to:
   control the switches so as to apply a voltage to the second electrode and ground the third electrode, and measure a voltage difference between the first electrode and the fourth electrode as a pressing force, or control the switches so as to apply a voltage to the first electrode and ground the fourth electrode, and measure a voltage difference between the second electrode and the third electrode as a pressing force;
   calculate an amount of change in the pressing force from a previous pressing force and a current pressing force measured by the processor; and
   when the amount of change in the pressing force exceeds a threshold, set a pressing change flag, associate the current pressing force and the amount of change in the pressing force with coordinates of a contact point, and output the pressing change flag and a result of the association to an external device.

* * * * *